US 8,560,822 B1

(12) United States Patent
Chan et al.

(10) Patent No.: US 8,560,822 B1
(45) Date of Patent: Oct. 15, 2013

(54) PRE-BOOT OPERATING ENVIRONMENT

(71) Applicant: Phoenix Technologies Ltd., Milpitas, CA (US)

(72) Inventors: Steven Chan, Fremont, CA (US); Dan Kikinis, Los Altos, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

(21) Appl. No.: 13/764,313

(22) Filed: Feb. 11, 2013

Related U.S. Application Data

(63) Continuation of application No. 13/481,827, filed on May 26, 2012, now abandoned.

(60) Provisional application No. 61/490,515, filed on May 26, 2011, provisional application No. 61/493,017, filed on Jun. 3, 2011.

(51) Int. Cl.
*G06F 15/177* (2006.01)

(52) U.S. Cl.
USPC .................................... 713/1; 713/2

(58) Field of Classification Search
None
See application file for complete search history.

(56) References Cited

U.S. PATENT DOCUMENTS

| 5,929,849 | A | * | 7/1999 | Kikinis | 725/113 |
| 6,154,844 | A | | 11/2000 | Touboul et al. | |
| 6,442,623 | B1 | | 8/2002 | Kim | |
| 6,564,318 | B1 | * | 5/2003 | Gharda et al. | 713/2 |
| 7,778,675 | B1 | * | 8/2010 | Righi | 455/574 |
| 2005/0289289 | A1 | * | 12/2005 | Chang | 711/103 |
| 2009/0319806 | A1 | * | 12/2009 | Smith et al. | 713/193 |
| 2010/0079472 | A1 | * | 4/2010 | Shang et al. | 345/545 |
| 2010/0306773 | A1 | | 12/2010 | Lee et al. | |
| 2012/0143767 | A1 | | 6/2012 | Abadir | |

FOREIGN PATENT DOCUMENTS

WO    WO2008073618  A2    6/2008

* cited by examiner

*Primary Examiner* — Dennis M Butler
(74) *Attorney, Agent, or Firm* — Brokaw Patent Law PC; Christopher J. Brokaw

(57) ABSTRACT

Approaches for a pre-boot operating environment. A BIOS, executing on a machine, is configured to execute a program prior to booting an operating system executing on the machine. Prior to loading an operating system on the machine, the program executes to establish a pre-boot operating environment. The pre-boot operating environment may support the execution of one or more application therein. The pre-boot operating environment may be a Linux-style or Unix-style operating environment.

21 Claims, 8 Drawing Sheets

| Field | Offset | Length |
|---|---|---|
| Handle | 00h | 1 byte |
| Link to next list | 01h | 1 byte |
| VROM List State | 02h | 1 word |
| VROM Type | 04h | 1 word |
| Offset to VROM data | 06h | 1 dword |
| VROM data size | 08h | 1 dword |

Table of VROM List Structure

| |
|---|
| Handle: VROM List Identifier |
| Link to next list: A pointer to a next VROM List |
| VROM list state: Represents the status of a VROM List |
| VROM type: Type of represented VROM data |
| Offset to VROM data: Physical location offset |
| VROM data size: Indicates length of VROM data |

FIG. 5

PRE-BOOT OPERATING ENVIRONMENT

CLAIM OF PRIORITY AND RELATED APPLICATION DATA

This application is a continuation of, and claims priority to, U.S. non-provisional patent application No. 13/481,827, filed May 26, 2012, invented by Steven Chan et al., entitled "Pre-Boot Operating Environment", which claims priority to both U.S. provisional patent application No. 61/490,515, filed May 26, 2011, invented by Steve Chan et al., entitled "System and Method for Enhanced Functionality in a Pre-boot Environment," and U.S. provisional patent application No. 61/493,017, filed Jun. 3, 2011, invented by Steve Chan et al., entitled "Enhanced System and Method for Pre-boot Management of Drivers and Programs"; the contents of these three patent applications are hereby incorporated by reference for all purposes as if fully set forth herein.

This application is also related to (a) U.S. non-provisional patent application No. 13/763,986, filed Feb. 11, 2013, invented by Steven Chan et al., entitled "Pre-Boot Management of Drivers and Programs", (b) U.S. non-provisional patent application No. 13/764,396, filed Feb. 11, 2013, invented by Steven Chan et al., entitled "Augmenting a BIOS with New Programs", (c) U.S. non-provisional patent application No. 13/764,364, filed Feb. 11, 2013, invented by Steven Chan et al., entitled "Assessing BIOS Information Prior to Reversion", and (d) U.S. non-provisional patent application No. 13/764,087, filed Feb. 11, 2013, invented by Steven Chan et al., entitled "Automated BIOS Enhancements and Upgrades"; the contents of these four patent applications are hereby incorporated by reference for all purposes as if fully set forth herein.

This application is related to U.S. Pat. No. 5,929,849, filed May 2, 1996, invented by Dan Kikinis, entitled "Integration of dynamic universal resource locators with television presentations", the contents of which are hereby incorporated by reference for all purposes as if fully set forth herein.

This application is related to U.S. Pat. No. 6,564,318, filed Jun. 18, 1999, invented by Laurent K. Gharda et al, entitled "Method and Apparatus for Execution of an Application during Computer Pre-Boot Operation and Post-Boot under Normal OS Control", the contents of which are hereby incorporated by reference for all purposes as if fully set forth herein.

FIELD OF THE INVENTION

Embodiments of the invention relate to a pre-boot operation environment of a device.

BACKGROUND

When a computer is powered on, the computer undergoes an initial set of operations to configure the hardware and software of the computer. This process is generally known as the boot process. Various patents over the years have addressed various concerns about the boot process. For example, U.S. Pat. No. 6,564,318 ("the '318 patent") is directed towards an approach concerning the pre-boot environment. The contents of the '318 patent are hereby incorporated by reference for all purposes as if fully set forth herein. Further, a Unified Extensible Firmware Interface (UEFI) standard has been developed by the Unified EFI Forum industry group to enhance the booting process of modern computer systems. However, not all problems in the boot process have been addressed by the UEFI standard and/or known techniques.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 5 is a table illustrating a virtual random access memory (VROM) list structure and an accompanying definition table according to an embodiment of the invention;

DETAILED DESCRIPTION OF THE INVENTION

Figure 1:
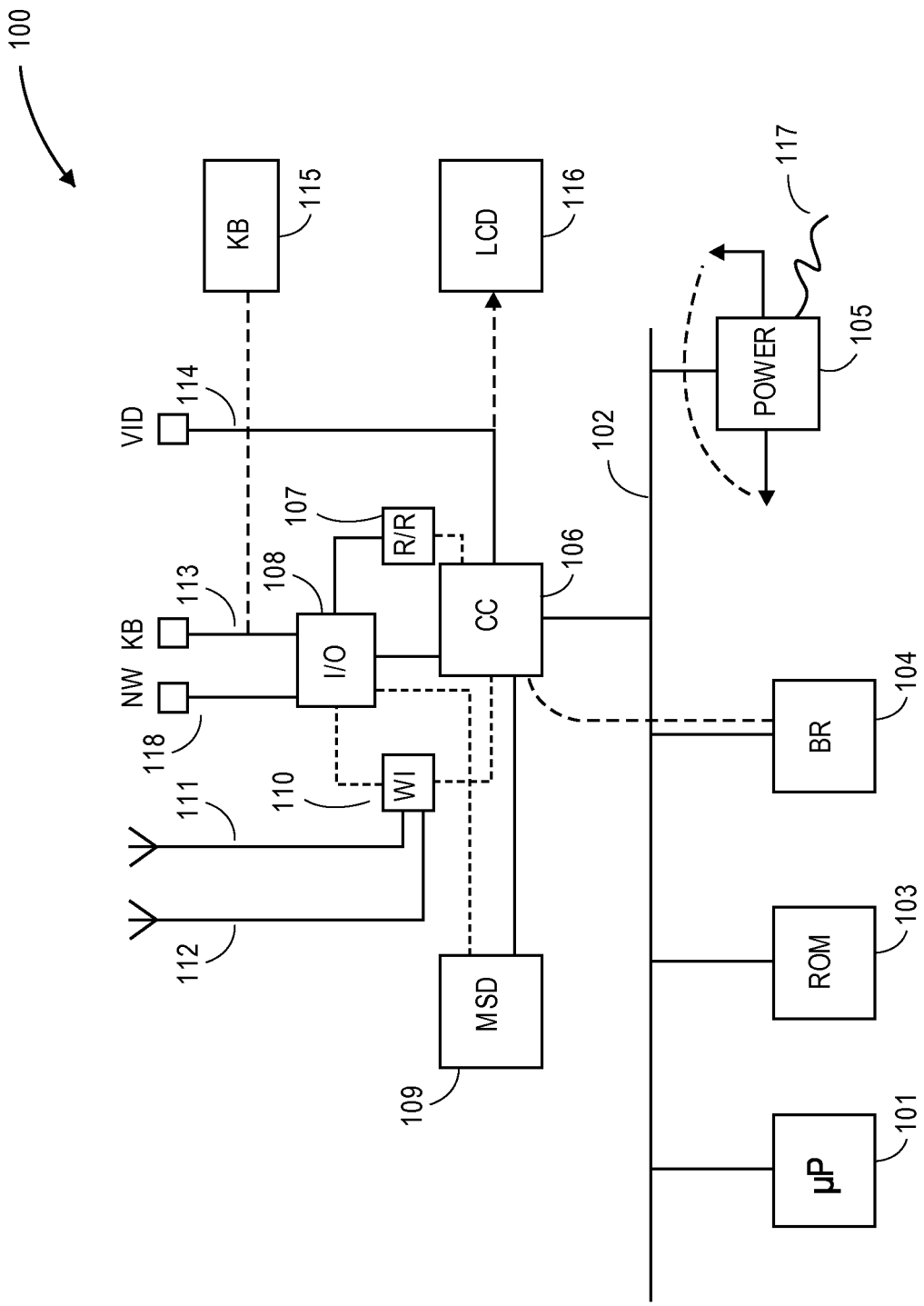
FIG. 1 is a block diagram depicting a system according to an embodiment of the invention.

Approaches for a pre-boot operating environment are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments provide an enhanced pre-boot environment by enabling downloadable Linux C++ (DLC) to be supported in a pre-boot phase of a device, such as a computer. This enables more complex applications to be run within the pre-boot environment. Specially, this feature enables certain application to be executed very quickly; in effect, programs such as IP telephony programs (for example, Skype and media players) may have an "instant-on" capability. Such an "instant-on" capability allows programs, such as the IP telephony programs, to be executed prior to the loading of the OS. Additionally, drivers (such as for a carrier network, WiFi-network, LAN, and the like) may be made available for use much earlier in operation.

Embodiments also provide for an enhanced type of media players. BIOS boot messages may appear in a window displayed on the screen (for example, in a picture-in-picture type window or a status bar) while the rest of the screen may show either static or dynamic video and images. In certain embodiments, advertisements may be shown. The advertisements may enable a user to click on them to purchase associated products or services or bookmark the advertisement to make a purchase at a later date, such as when the system is able to access the merchant associated with the advertisement. Embodiments also inform the operating system when a purchase or bookmark is requested.

Embodiments of the invention also enable a BIOS to reprogram itself without requiring an operating system bootable disk as is currently required in almost all cases. In certain embodiments, the reprogramming and/or updating of the BIOS is entirely automatic, i.e., without human intervention. Such reprogramming and/or updating of the BIOS may be performing over a wireless network.

Certain embodiments of the invention shall be termed BIOS Over-the-Air (BOTA). In a large manufacturing facility, reflashing last-minute changes in BIOS can be quite challenging. To be able to do it with BOTA inside a factory environment would be helpful for an Original Equipment Manufacturer (OEM). BOTA in a factory may involve a mass flash feature that can only be used inside the factory, and potentially tied to a specific server/router.

Embodiments of the invention may also allow for a flash memory that stores a BIOS and other drivers to a re-flashed over the air (OTA) using a wireless network. A BIOS of an embodiment may connect with a remote server over a wireless network and check to determine if a new version of the BIOS is available. Such an ability may be employed at different stages of operation. For example, a BIOS may determine if a new version of the BIOS is available over a wireless network (a) during the pre-boot stage, or (b) when no operating system is currently operating or available from which to boot.

In an embodiment, a special driver may determine if a new version of the BIOS is available over a wireless network during the normal operation of an operating system, such as Windows or Linux. Such a driver may check for BIOS updates in the background while the operating system is running, compare any updates the driver found to the current BIOS, and (subject to user opt-in if so configured) download a file (potentially encrypted) into a hidden partition that is exclusively reserved for the BIOS. The encryption/decryption of the file may be performed by a client contained in the original BIOS. In the operating system, this partition can be in the form of a hidden and/or locked operating system file. The OTA flashing system of an embodiment is scalable and can have worldwide coverage using CDN networks.

In some cases, rather than using a WiFi or BlueTooth wireless, a 3G, 4G or similar connection may be used. Sometimes, the user will be asked for permission. In some cases, the system may connect to a toll free service to be provided by the system manufacturer at no extra charge to the user.

In other embodiments, a media player (such as described, for example, in the '318 patent), was be launched in a pre-boot environment. Such a media player may play full media content within seconds, or even milliseconds, of turning on the system power, akin to an embedded special application.

In an embodiment, all credentials are re-checked to provide a means to use a wireless carrier in the performing of installing or updated BIOS or applications used thereby if such access is built-in or added on (in the form of an air card). In situations where a wireless network is available, the BIOS could look for communication devices, such as a modem, to connect to the Internet. It may be desirable to ask the user for permission to connect as certain avenues to connect to the Internet or other such network may incur charges. This feature could be employed in situations where the system cannot obtain access to the Internet during operation.

Embodiments of the invention may be employed in certain contexts that preclude or severely limit the number of "add-on" peripheral devices (such as those devices that may be added via USB extensions or an internal mini-PCI or similar slot for example), such as, for example, notebooks, tablets, and any type of closed systems.

Embodiments may also provide for an accelerated boot process that stores the last boot configuration and which may be employed to immediately boot the host system by initializing certain peripherals without having to first detect them, thereby resulting in a faster boot. The faster boot process consequently allows certain applications, such as a media player, to be launched earlier than prior approaches.

Moreover, embodiments provide a means to transition from operating using the former BIOS to the new BIOS with minimum user interface or awareness, preferably in cooperation with the operating system. This transition may occur at different times, such as during a pre-boot phase or a non-boot phase or even a post-boot phase. This transition may even occur while the operation system is in operation by replacing certain procedures used by the operating system with procedures available through a driver while the actual BIOS is reflashed. A lock on the operating system shutdown may be used to extend the shutdown time so that the flash can be completed. During the shutdown process a message may be displayed to warn that the system is upgrading and the user should not power off the computer.

Other embodiments of the invention may offer a mechanism to reflash or update certain portions of BIOS or flash memory. Instead of performing a full reflash, a partial reflash may be performed in embodiments. Such an approach may be advantageous, for example, to add or remove applications during a self-discovery process.

In an embodiment, individual PCs and the like can be reflashed using the unique 128 bit UUIDs and manufacturer information stored in the SMBIOS table. In this approach, "mass" compromise of BIOS in systems can be minimized, as systems have to be compromised individually, not en masse.

Embodiments also provide a means to reflash or update option ROMs. In some situations, the entire BIOS need not be reflashed; instead, only certain updates or application options need to be installed and so only a partial reflash, rather than a full reflash, may be required. Depending on the type of FLASH chip used (e.g., portioned, multi- or two partitions, etc.) and its implementation on a specific motherboard, a new image should be created, since in some cases the whole chip must be reflashed anyway. Additional copies of previous versions may be saved in a "secret" BIOS file. Such a "secret" BIOS file could be, for example, in the range of 50 MB to 100 MB is size, which is a large multiple of the size of a normal BIOS. However, compared to the disk sizes typically available, even in "light" operating environments, the size of the "secret" BIOS file is very small.

The BIOS may be extended with one or more applications that can, for example, run during the pre-boot stage. These applications may be stored in the BIOS or in the hidden file that the BIOS can also access without booting the operating system. Such a feature represents a kind of "app store" that can provide applications signed by the BIOS issuer as approved for plug-in applications that can be used in conjunction with a pre-boot or post-boot environment.

Embodiments also provide means to collect payment for applications that are flashed to BIOS. The "app store" mentioned above may be able to disperse applications that are purchased by the consumer, and so applications could be disbursed for free or may require payment. Non-limiting, illustrative payment systems in which payment may be tendered include credit cards; electronic payment systems such as PayPal and ACH, or other suitable current or future payment means. Credit card information or other purchasing credentials can be encrypted and stored in the BIOS to be accessed and updated by an authenticated and authorized user.

System Description

The BIOS with its various constitute and complimentary components, although some of them may not be considered a BIOS or part thereof, should be considered in their totality a BIOS eco-system. FIG. 1 is a block diagram depicting system 100 according to an embodiment of the invention. Included in system 100 are bus 102, microprocessor 101, RAM 103, and non-volatile boot ROM 104, which may be a flash memory device or any other suitable nonvolatile memory device. Non-volatile boot ROM 104 may be a flash memory device that is divided into separate sections that may be erased and reprogrammed separately. Non-volatile boot ROM 104 may correspond to a single, large flash device or a page flash device, where each page could be erased and reprogrammed separately.

Further included in system 100 are power supply 105, mass storage unit 109, controller 106, I/O controller 108, real-time clock 107, and wireless interface 110. Note that mass storage unit 109 may or may not be separate from boot ROM 104. Particularly in tablet systems, the mass storage unit may be a separate section within boot ROM 104.

The example of FIG. 1 depicts two antennae 111 and 112; however, more than a dozen different types of wireless LAN and WAN systems could be used. Thus, those in the art shall appreciate that antennae 111 and 112 are merely exemplary of any and all known and reasonably similar future technology, including but not limited to Bluetooth, WiFi, Ultra-wideband (UWB), WiMAX, 3G, GFM3G, CDMA, 1XRPT, Edge, 4G, etc., all of which should be considered as capable of being included or otherwise employed by embodiments, thus giving system 100 the maximum latitude to connect to the Internet (not shown).

A video output from controller 106 can go to an LCD display 116. Many embedded system have a video controller embedded in the core controller 106, which controller may comprise one chip or a larger chip set. In some cases, exemplary system 100 may have an additional video output 114.

Also, system 100 may include a built-in keyboard 115 or a keyboard connector 113, or both, and other I/O devices such as, for example, one or more pointing devices, such as a pad, a trackball, a j-mouse, etc., as well as an additional wired network connection 118. External power supply 117 may plug into internal power unit 105.

The architecture of system 100 is only exemplary of certain types of systems, and, depending on the type of system, there may be multiple buses or multiple levels of hierarchical buses, such as in the X86 architecture or more advanced architecture with a north bridge and a south bridge and three bus levels. However, functionally, they are all more or less equivalent to a flat bus structure, and a hierarchy typically is used only for acceleration. For example, the boot ROM 104 may not connect directly to the main bus 102, but it is always somehow controlled by controller 106. Similarly, mass storage unit 109 may connect in some cases to an I/O controller 108, or other cases to controller 106, depending on the type and the level and the performance of the interface. Also, in some cases, an external hard disk may be available, connected to an external serial advanced technology attachment (eSATA) port or functionally similar (not shown, for purposes of clarity and simplicity only), which is an industry-standard computer bus interface for connecting host bust adapters to mass storage devices, or other connections. Exemplary system 100 can boot without any installed operating system on storage unit 109, which may be a hard drive, flash drive, or any other storage unit with the characteristics of a nonvolatile mass storage unit. System 100 may boot into a pre-boot environment, as described in U.S. Pat. No. 6,504,318, which is incorporated by reference in its entirety as if fully set forth herein, or it can it can boot from storage unit 109, if an operating system is installed thereon.

Illustrative Factory Environment

Figure 2:
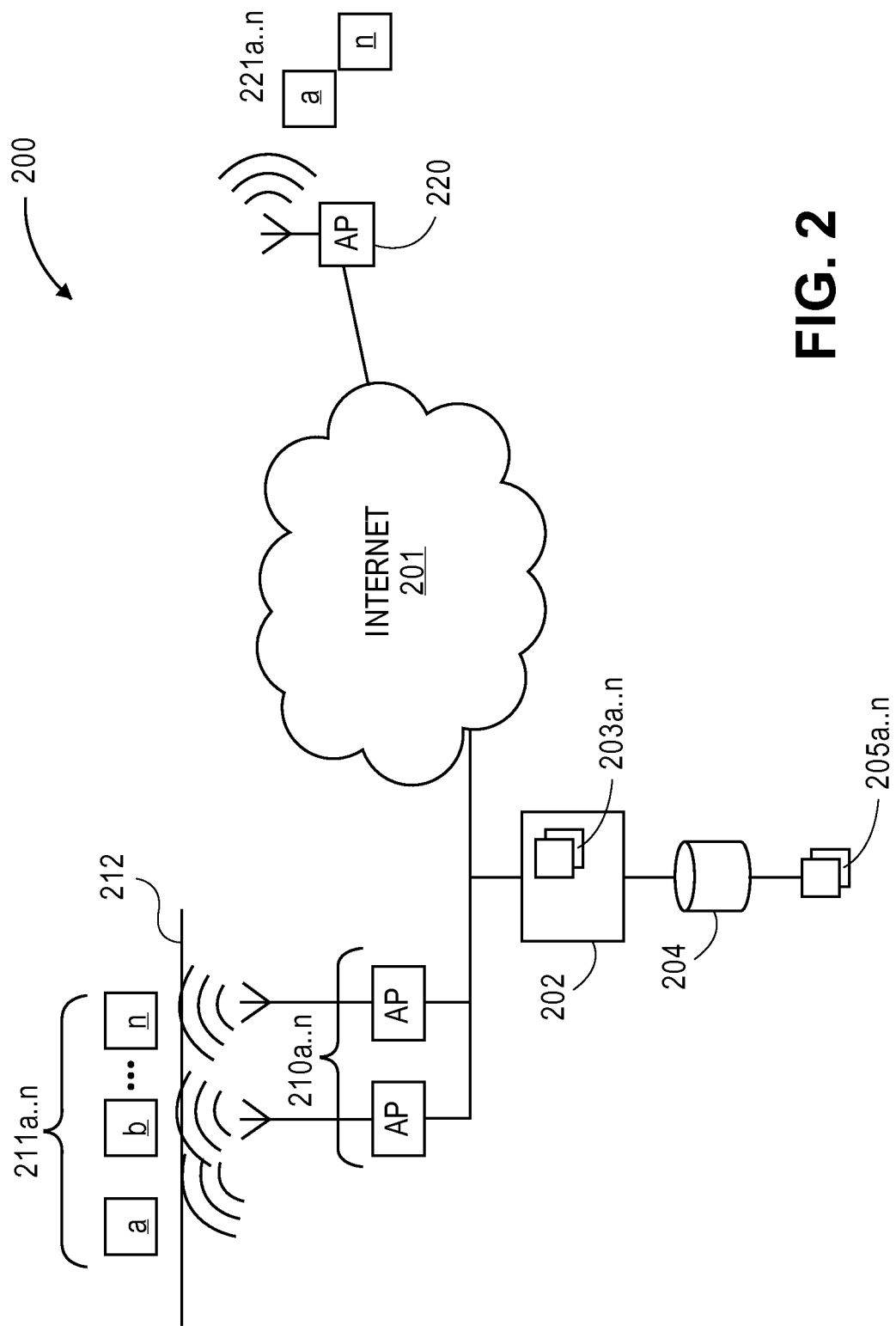
FIG. 2 is a block diagram depicting an exemplary factory environment 200, according to an embodiment of the invention.

FIG. 2 is a block diagram depicting an exemplary factory environment 200 according to an embodiment of the invention. Systems 211a-n, shown by FIG. 2 by exemplary units 211a, 211b, and 211n, are on production line 212. Along production line 212 are access points 210a-n, which connect to factory server 202. Server 202 contains information stored in mass storage unit 204 in the form of data instances 205a-n, such as, for example, look-up tables, etc. Also running on server 202 are software instances 203a-n, of which certain ones enable uploading onto the web, as web content, instances of data 205a-n.

Each unit 211a-n contains a unique ID number (not shown) typically programmed into a parameter section of its nonvolatile boot ROM 104. This unique ID number identifies the configuration of the particular unit, as well as other manufacturing and support-related items, including but not limited to such items as configuration, chipsets and their revisions, etc. One instance 203x of server software 203a-n could thus read the unique ID number, look up the configuration of the host system from a look-up table 205x, and identify the correct BIOS for each system.

In some cases, in addition to the unique ID number, a system 211a-n may have the ability to create its own configuration table for user-added devices, either within the BIOS or boot program (used interchangeably herein) and or in conjunction with the operating system and/or an application running on the operating system. When such a system connects through a network, as, in this example, through access points 210a-n, the system can immediately connect to server 202 and download an updated version of the BIOS. The approach described above permits the installation of a preprogrammed ROM during manufacturing that contains a basic, simple BIOS, and then, when the units are powered on, they can automatically download and install an updated BIOS. Further, any time during their lives, these systems can download and install a BIOS update from an external point, as long as they can connect. For example, systems 221a-n connect to access point 220, which could be any public or private access point, and thence via Internet 201 to server 202. In some cases, access points may be connected directly or through a gateway to the Internet. An access point provides access for a Local Area Network (LAN) type wireless network to a wired LAN and/or to a wired or wireless Internet connection.

Mass Storage Device Partitions

Figure 3:
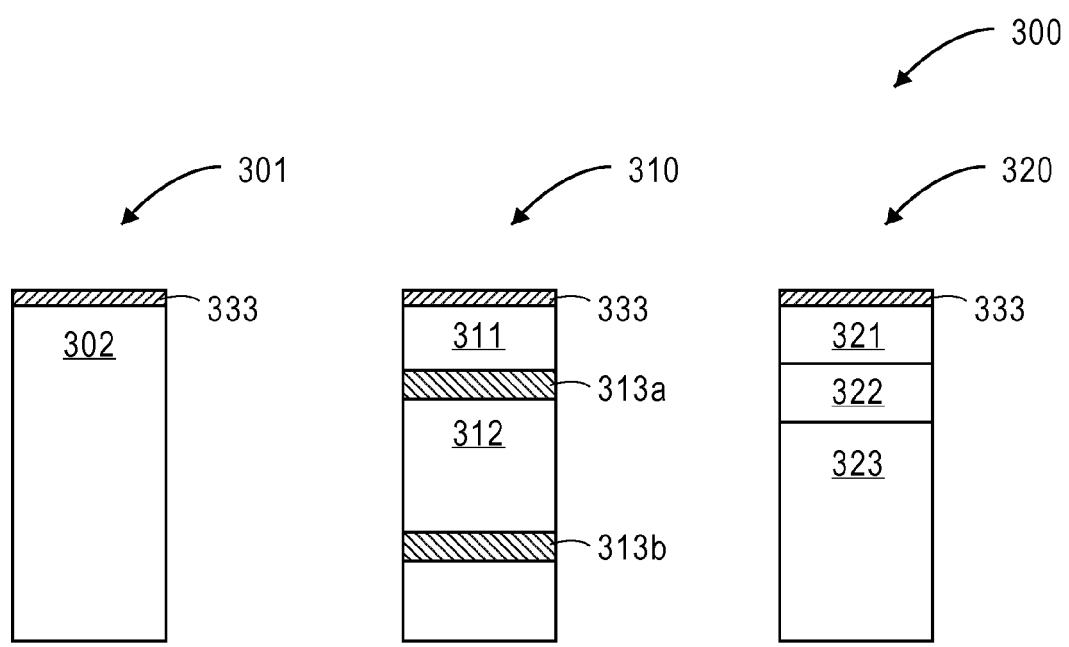
FIG. 3 is an illustration of a set of examples involving partitioning mass storage device (MSD) and how the BIOS/boot program-related items and programs may be stored therein according to an embodiment.

FIG. 3 is an illustration of a set 300 of examples involving partitioning mass storage device (MSD) 109 and how the BIOS/boot program-related items and programs may be stored therein according to an embodiment. Example 301 shows a typical approach of partitioning a master boot record 333 and one storage unit 302.

Example 310 involves a master boot record 333, a secure boot partition 311, and a standard data storage partition 312, contained in which are additional header information 313a and an additional embedded file 313b. File 313b may be used to store the data for the pre-boot environment. File 313b may be hidden from normal user access as a system file, thereby offering it a level of protection. File 313b may be located in a predetermined specific section of the mass storage unit so that file 313b is easy to locate. A simple file system may be embedded within hidden file 313b, which may function as an operating system in the pre-boot environment.

Example 320 involves a master boot record 333, a secure boot partition 321, main storage unit 323, and a separate partition 322 for the BIOS use. Partition 322 is used only in the pre-boot environment and may be inaccessible, or difficult to access, from the normal operating system. Some tools may need to access partition 322 during normal operating system or post-boot operations, but partition 322 may be secured from all but an authorized super user.

Installing A BIOS Update

Figure 4:
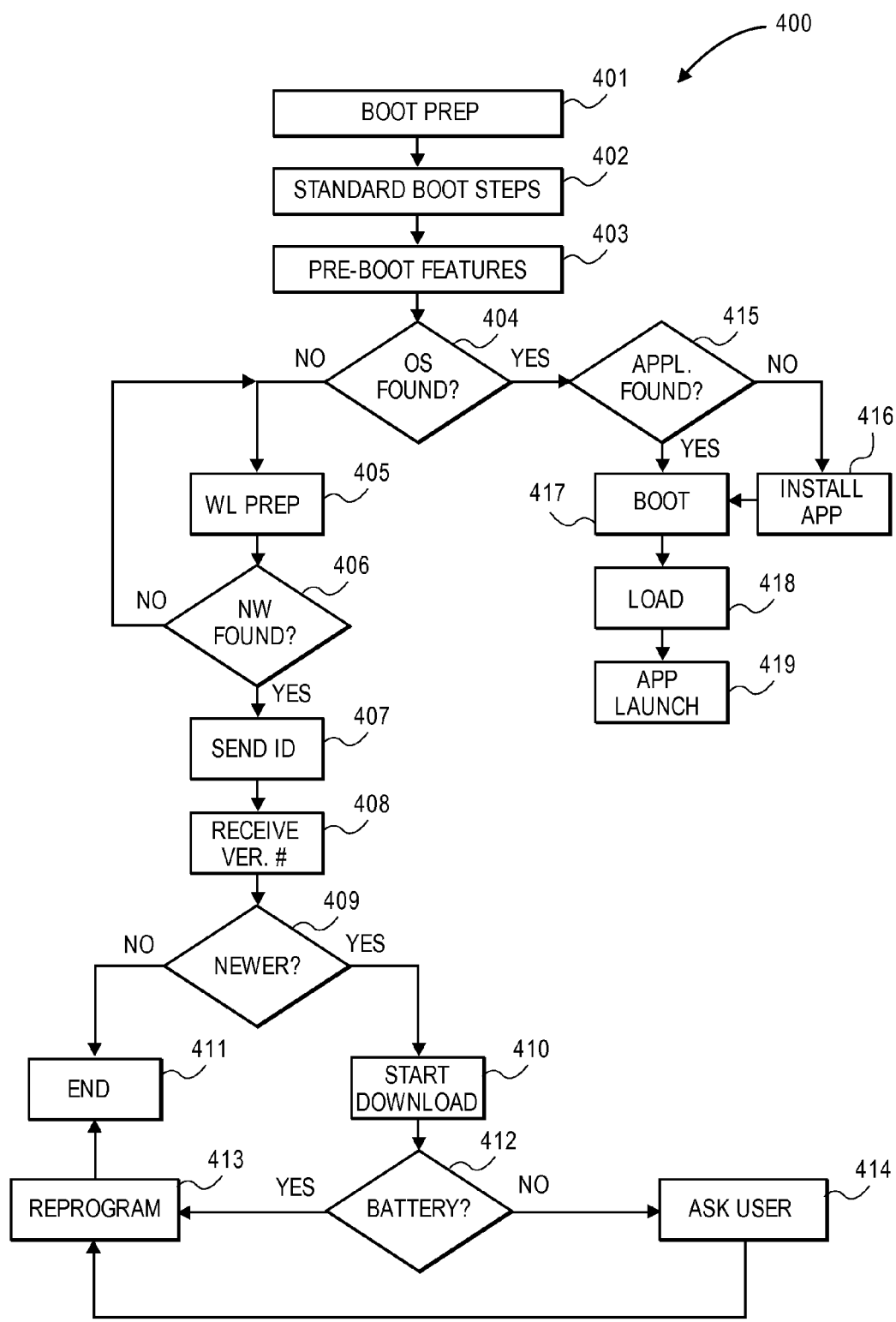
FIG. 4 is a flowchart illustrating an exemplary process for downloading a BIOS update without booting the operating system according to an embodiment of the invention.

FIG. 4 is a flowchart illustrating process 400 for downloading a BIOS update without booting the operating system according to an embodiment of the invention. Process 400 may be performed in conjunction with a Pre-boot Application Manager (PAM) described further below. In an embodiment, a PAM is a BIOS extension module configured to locate, initialize, and execute certain applications, including, in some cases, for example, BIOS upgrade. In other embodiments, the PAM may check the not-yet-booted operating system (OS) for correctness of drivers matching the present hardware, etc., as well as correct bootable configuration of the drivers and such, thereby ensuring a smooth boot capability of the operating system.

In step 401, the boot preparation routine activates all the host matching hardware.

In step 402, all the chips are initialized as in a standard boot preparation. The system can read the list of chips from a short table, so the software need not do a full system hardware discovery, but rather, relies on the last known operational state. Discoveries of new devices can be left to the operating system to make updates for the next boot.

In step 403, any necessary pre-boot features are enabled.

In step 404, the system checks to determine whether an operating system is present. If no operating system is present (no), then the process moves to step 405, where the system prepares to launch a wireless communication shell.

If, in step 406, the system does not find a connection to a wireless network (no), then the process waits a certain period and then loops back to step 405 to try again. Although not shown, after a certain number of attempts, the system may be configured to shut down, return an error message to the user, or return a request to plug the host machine into a wired network.

In step 407, after the host machine connects to a network (yes), then the system sends an ID to a specific server, as described above in the discussion of FIG. 2.

In step 408, the server sends back a verification number, which is similar to a certificate, while also informing whether a newer BIOS version is available or not.

In step 409, if no server version is available, (no), then the process ends at step 411.

If, in step 409, a newer BIOS version is available (yes), then in step 410, the system starts to download the newer version to the host machine.

In step 412, the system checks the power availability of the host machine, to determine if the machine is AC powered or if the battery is sufficiently charged with a sufficient minimum, such as, for example, 50 to 70 percent. The system may make an additional check in some cases as the battery may provide an inaccurate charge reading immediately after boot; after one or two minutes, the battery reading is more accurate.

If the system is deemed to have sufficient power (yes), then the process moves to step 413, where the BIOS is reprogrammed into the boot ROM, and then the process ends at step 411.

If, in step 412, the battery does not have sufficient charge to complete the process (no), then the system moves to step 414, where it may send a message asking a user to plug the machine into AC power or connect it to a charger and leave the charger connected during reprogramming.

If, in step 404, an operating system is found (yes), then the process moves to step 415, where the system checks the operating system partition for the presence of a post-boot application (PBA) that can manage a BIOS update while the operating system is running.

If no such application is found (no), then the system moves to step 416, where the system installs such a post-boot application into the operating system from a reserved partition, such as 313a, 313b, or 322, as described earlier in the discussion of FIG. 3.

The process then moves to step 417, as it does from step 415 if an application is found (yes), where the operating system boots. The operating system loads in step 418, and in step 419, after the operating system boot, the application automatically launches. The process then moves to step 407, and moves through the subsequent step described above.

Note that step 413 may be delayed until the user assents in response to a prompt, as this step may require a reboot of the host machine. Alternatively, the process may pause, after the download in step 410, until the next time the host machine boots, when it would continue with the reprogramming. In some cases, the download may be interrupted, so on the next boot, between steps 404 and 405, the system may execute a test to determine whether the updated BIOS downloaded completely. Depending on the outcome of such a test, system may connect to the network and finish or repeat the download, or it may skip connecting to the network and go to step 413, if the download was found to be complete, and then reboot.

Some or all of the steps described above may be activated only, for example, after a user opt-in; whereas in the factory, the auto-update may initially be active, allowing the system to be upgraded until final shipping in an easy manner. Typically, a user would be queried if an upgrade should be made, unless at least 50-70 percent of battery is available. Further, in some cases, a reflash may be done while the operating system is operational, for example, by using the PBA to temporarily provide services in lieu of the BIOS. In other cases, the operating system may be "frozen," using a sleep mode, etc., and then transposing any variables as needed (such variable typically may be stored in a section of the RTC CMOS memory). In some cases, the reflash is launched as part of a shutdown sequence, much as normal installations and operating system upgrades do. It then transposes the variables and reboots the system later.

Also, in addition to checking for an updated BIOS, the PAM may check, in conjunction with the PBA or by itself, for correct drivers, etc., after a user opt-in. Because the operating system typically is shipped in a "virgin" mode, meaning no user is installed or activated in the operating system, the ability to load additional drivers into the image using the PAM is very valuable, as the PBA cannot be activated in most operating systems in use today. Once a user account is present, further automatic updates may be suspended, pending user consent. Further, in addition to the PAM downloading new BIOS images as described above, but the PAM may also download newer versions of a PBA, as well as other support files, including but not limited to drivers and the like.

VROM List Structure

FIG. 5 is a table illustrating a virtual random access memory (VROM) List structure and an accompanying definition table according to an embodiment of the invention. It is anticipated that the list structure and accompanying definitions depicted in FIG. 5 to be self-explanatory to those of ordinary skill in the art.

The VROM List of FIG. 5 informs the calling software application information about where data is stored, how large each data block is, the type of data (such as VGA), and so forth. Such data will change to reflect the current status after an installation and/or deletion of a program. A mechanism (now shown) is also provided to offer a set of instructions in the event of a return error that indicates a problem with an installation. For example, a protection mechanism may restore previous settings by using a mirroring technique (known in the art) so that a backup or default installation may take priority.

It will be apparent to those of ordinary skill in the art that there are a variety of alterations that might be made to the embodiments described herein without departing from the spirit and scope of the teachings herein. Some of these variations have already been discussed, such as the use of other non-volatile storage devices other than a flash ROM, and differing sizes of storage devices. It is well-known that programmers have individualistic ways to structure code, and many variable code structures may accomplish similar ends. Similarly there are many sorts of plug-ins that may be accomplished to a VROM BIOS according to embodiments. Some may accomplish pre-boot functions and other may accomplish post-boot BIOS-enabled functions. Among the many possibilities are disk utility programs, virus protection programs, PC card scanning programs, specific device BIOS code, and the like.

Pre-boot Application Manager (PAM)

In an embodiment, a BIOS extension module is provided and adapted to locate, initialize, and execute certain applications, including multimedia applications in some cases, from stored location on a hard drive or other connected mass-storage-device (MSD) before normal booting of the operating system. The extension module, termed a pre-boot application-manager (PAM), may be provided as part of a normal BIOS, or as part of a V-ROM BIOS described in the '318 patent.

in a preferred approach, a V-ROM BIOS is used because of versatile flash-in capabilities inherent to the device. A PAM is a software module installed or flashed in as an extension to a system BIOS such as a V-ROM BIOS. A PAM module in this example comprises separate parts that take up residence in specific areas of V-ROM-BIOS. For example, a NVM part of PAM is resident in non-volatile-memory (NVM) and is loaded and executed by V-ROM. A post-boot part of PAM is implemented for accessing or setting up new MSDs, finds required driver information (location and type), and binds that information into a third part or file-system-structure (FSS) module, which then becomes a part of NVM resident code. One or ordinary skill in the art shall appreciate that the functional implementation of a PAM into a BIOS chip, whether flashed in, or pre-installed, will follow BIOS convention during execution such as compression, shadowing, and addressing techniques that have already been described in the '318 patent. Therefore, the inventors deem that the process steps described below will be sufficient for explaining the approaches disclosed herein in an enabling manner.

Figure 6:
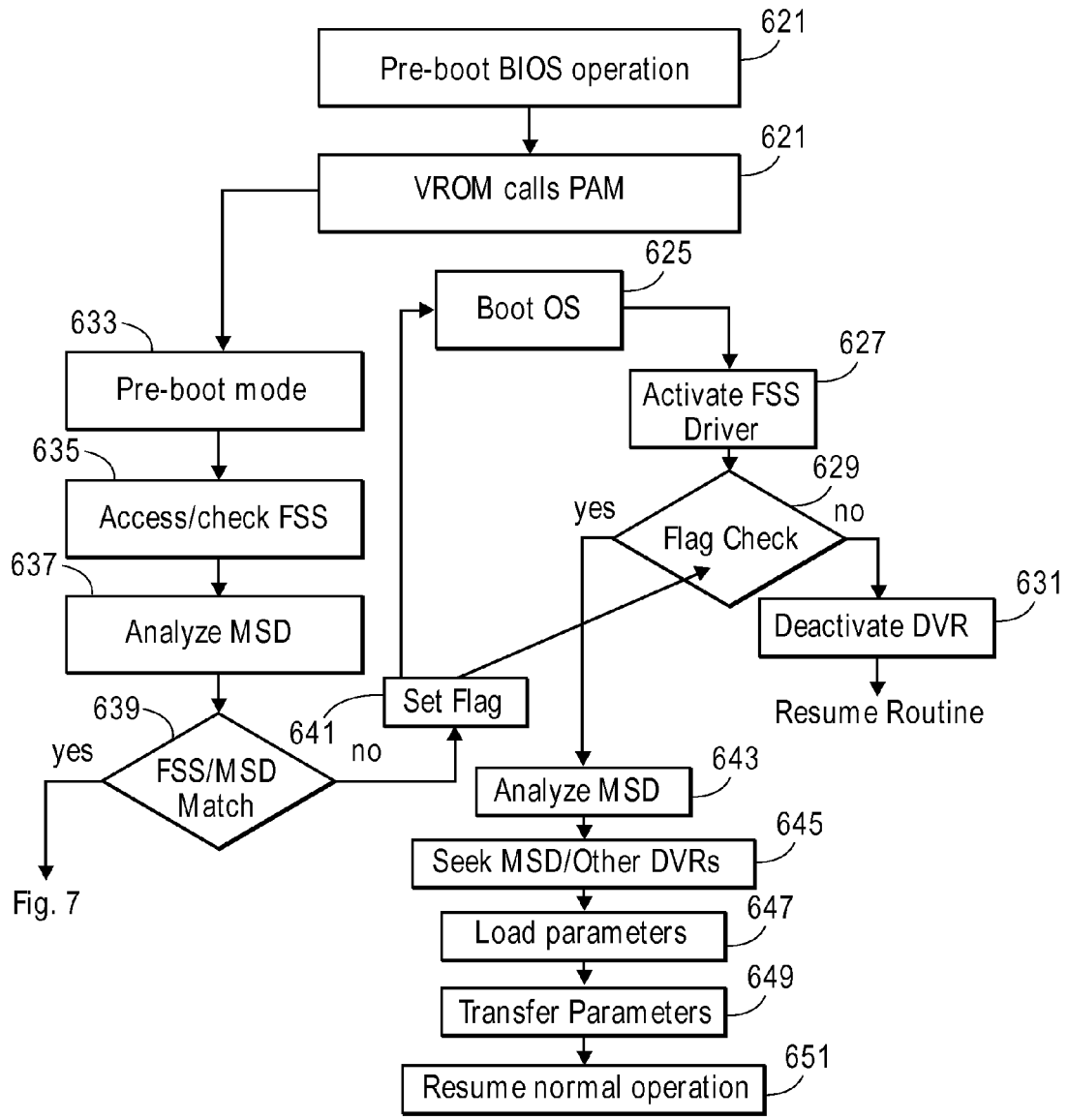
FIG. 6 is a flowchart illustrating the steps for V-ROM execution of a PAM according to an embodiment of the invention.

FIG. 6 is a flowchart illustrating the steps for V-ROM execution of a PAM according to an embodiment of the invention. The example of FIG. 6 assumes that a flashable V-ROM chip is installed and operable.

In step 621, pre-boot BIOS operation begins.

In step 623, V-ROM calls and executes a PAM module.

Step 633 represents a pre-boot mode during which time PAM begins operation.

At step 635, PAM accesses and scans its FSS module for valid MSD information such as type, size, operating system (OS) parameters, and so on. If MSD information pointers are available, indicating that a device is recognized, then the designated MSD is analyzed in step 637. This step confirms parameters for a match such as type (SCSI, IDE), size, (capacity, available memory), format (number of boot partitions, type of OS), and so on.

At step 639, PAM determines if a match has been made. If yes, the process resumes with steps illustrated in FIG. 7, step 740. However, if there is no match, then it is assumed that the system has been modified (given different instruction) or the MSD is a new device and has to be re-set. Assuming for purpose of description that the system is being booted for the first time after flash-in, or that a new default MSD is being added, there would be no match in step 639. At this juncture, PAM sets a flag (step 641) which may be a simple binary code so that new parameters associated with the new MSD may be loaded into BIOS for the next boot operation. Such parameters may include any required information including but not limited to driver location and identification for accessing and launching any pre-boot applications such as videos, static ads, audio ads, or other pre-boot informative displays. The process then proceeds as illustrated via directional arrow back to step 625 to boot the operating system.

After operating system booting is initiated in step 625, an FSS driver having the capability of accessing and analyzing a connected MSD is activated in step 627, along with other system drivers.

At step 629, the driver checks for the pre-set flag set in step 641.

If the flag is found (which means that there is currently no valid MSD installed), then the process proceeds to step 643 where the new MSD is analyzed.

At stop 645, the parameters associated with MSD drivers and other drivers that are generic to pre-boot applications intended to be executed during pre-boot operations are located on the MSD.

At step 647, such parameters are loaded and prepared for transfer into the FSS module of step 635.

After completion of transfer of parameters from the MSD into the FSS module at step 649, normal system operation, including complete booting of the operating system, resumes in step 651.

The next time that the system is powered on, the new changes are recognized during pre-boot analysis and any loaded ads, including multimedia ads, will be accessed and displayed automatically, after which the operating system will be booted.

If, however, no flag is set in step 641, then there will be no flag found in step 629, and the process will continue to step 631, where the unique driver that is part of the BIOS, and is used in the VROM-DVR, is deactivated. This assumes that required information was already accessed, loaded and matched in step 639 during a previous boot event. If so, then the process proceeds to FIG. 7, as previously described.

Figure 7:
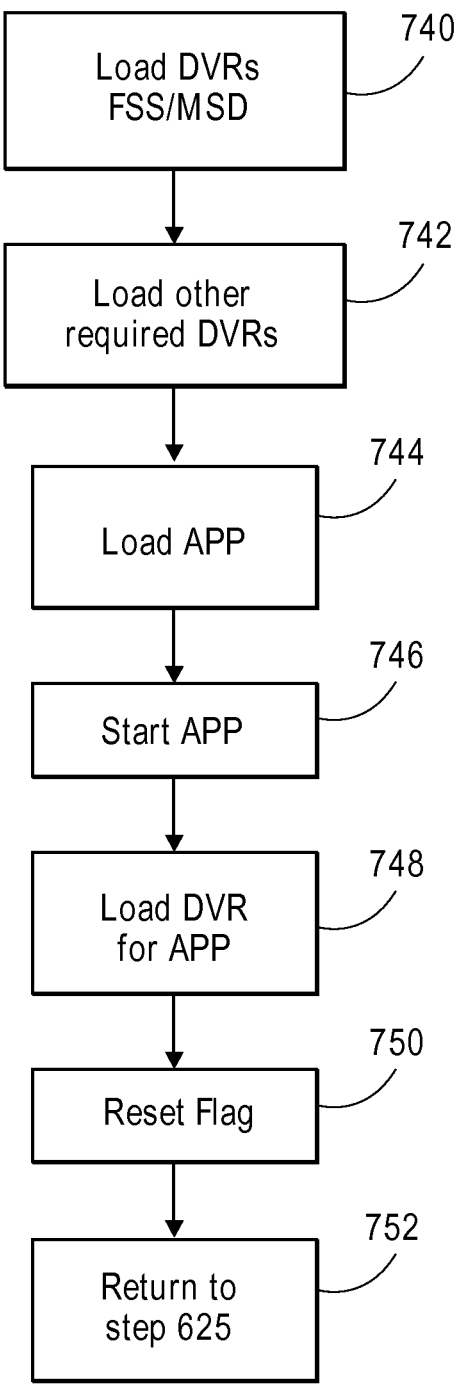
FIG. 7 is a flowchart depending from the flowchart of FIG. 6 that depicts an application loading sequence according to an embodiment of the invention.

FIG. 7 is a flowchart depending from the flowchart of FIG. 6 that depicts an application leading sequence according to an embodiment of the invention. FIG. 7 illustrates the loading sequence for accessing an MSD and displaying such as advertisements according to matched information contained in the FSS module of step 639 (FIG. 6).

In step 740, the FSS module accesses and loads MSD drivers into NVM.

In step 742 any application drivers are similarly loaded.

At step 744, any targeted application programs (e.g., ads) are loaded from the MSD.

The loaded applications(s) are then executed in step 746.

The application's driver is then executed in step 748 in a manner consistent with normal execution under a fully loaded operating system. The applications(s) are displayed during the time from power-on to OS-load (pre-boot and possibly during-boot).

A new flag is then set at step 750 which will point to any new additions or changes to the pre-boot advertisements for the next boot-up.

The process flow sequence as taught above in FIGS. 6 and 7 is meant to be exemplary of one such process that could be implemented in practice of the embodiments disclosed herein. There are many variations that may be included without departing from the spirit and scope of the system and method disclosed herein. In one example, an ad schedule may be downloaded from a switched packet network to an MSD. The ad schedule may include several individual ads, including but not limited to ads such as, perhaps, MPEG or other suitable format video clips, where one or more clips will be played per pre-boot event in serial order (rotated). An FSS driver capable of disseminating the ad schedule, and identifying the appropriate ad and application driver will set a new flag for the next ad after playing the previous ad. In this way, the next time the system is powered on, the new ad will be loaded and played.

As another example, an application is provided as part of PAM software that resides on a connected MSD and can communicate with counterpart software in system BIOS. In this example, any new ads of any media type may be selected by a user and flashed into BIOS at any time during normal operation. Similarly, such ads and driver information may be flashed into BIOS by a third party utilizing a connected network server adapted for the purpose. After the system is powered on, the new pointers are registered and retained into system BIOS (FSS module). These pointers may indicate, in some cases, a new or alternately selected MSD device on which the ads reside.

In another example, an FSS module may be segmented to contain separate blocks of information pertaining to more than one MSD having separate ads resident thereon. This variation may reflect a number of individual video-display-units (VDUs) networked together and having minimal and individual MSD capability. A main booting station and MSD connected to the network of VDU's may provide BIOS initialization for each connected unit. In this example, pre-boot ads or instruction may be personalized to individuals assigned such VDUs.

It is clear that many modifications and variations of the system and method disclosed herein may be made by one skilled in the art without departing from the spirit of the novel art of this disclosure. For example, BIOS for helping boot up a system may reside in a non-volatile memory, which BIOS has the ability to execute certain programs before booting an operating system, and these programs are able to connect to a server maintaining a database relevant to versions of the BIOS. Further, in some cases the BIOS could download a newer version of BIOS code, and the BIOS could then reprogram the non-volatile memory to use the newer code for the BIOS following the reprogramming. Further, a server may contain a program for automatic BIOS updates and a storage with at least one newer version of a BIOS, with the server responsive to inquiry by a system containing a BIOS, where such an interaction can be made without requiring an operating system present in the system. Additionally, the BIOS eco-system may contain code allowing the reprogramming to be made without requiring user interaction on the system or a reboot of the system. In some cases, the BIOS may contain code to connect over wireless communication when available, and thus connect to the server. Also, the BIOS may store the older version in a secure file in non-volatile memory, allowing the user to revert to a previous version in cases where needed or desired.

Launching Applications in A Pre-boot Environment

Figure 8:
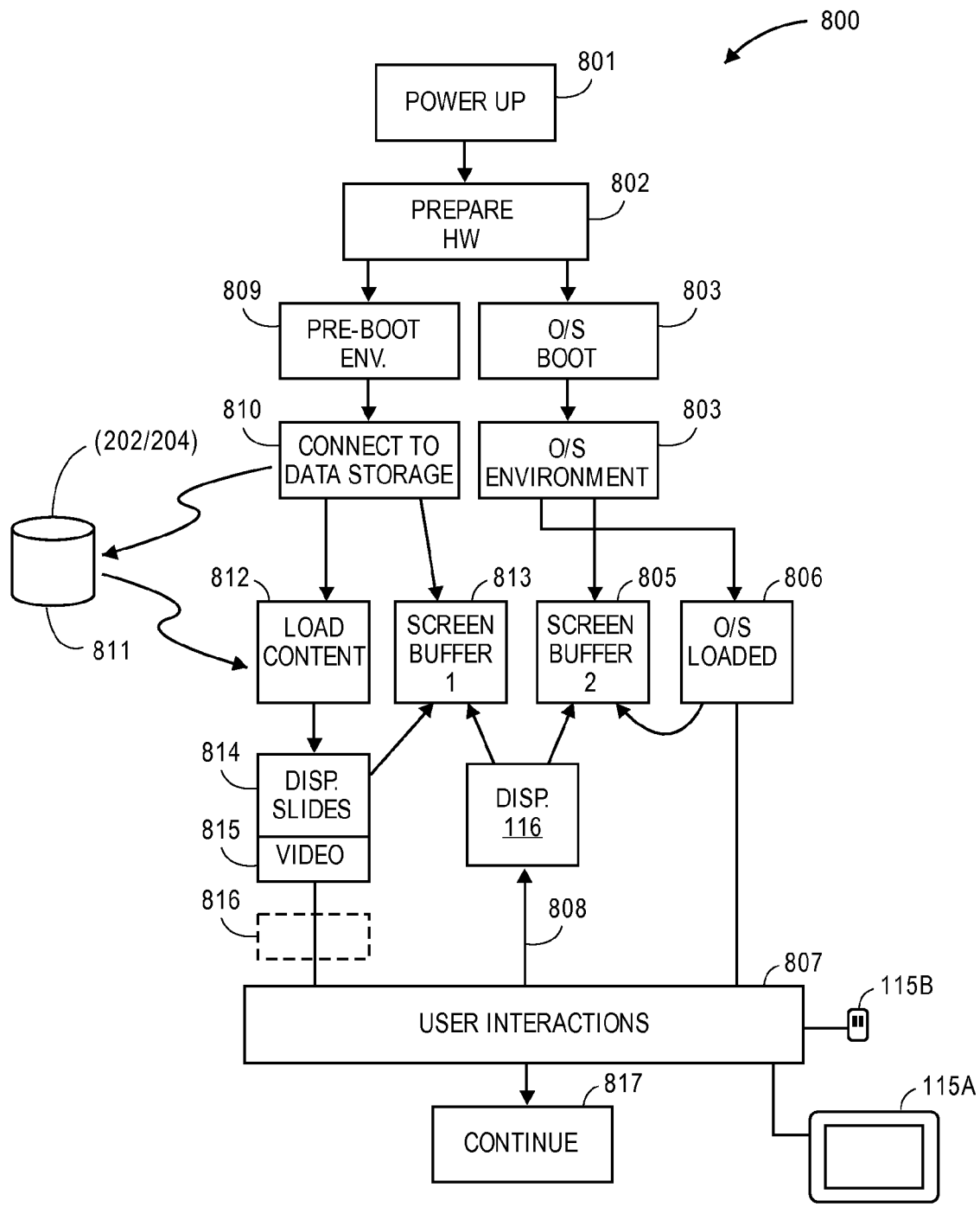
FIG. 8 is a flowchart illustrating process for an enhanced pre-boot sequence according to an embodiment of the invention.

FIG. 8 is a flowchart illustrating process 800 for an enhanced pre-boot sequence according to an embodiment of the invention. After a computer is powered on in step 801, the pre-boot sequence may, in step 802, branch into two different threads. These two different and in some cases co-temporal threads could be software threads for single core processors or separate core threads for multi-core processors, which are currently inexpensive and widely used, often even in more portable computing devices such as smart phones, tablets, etc.

In step 803, the operating system (OS) boots.

In step 804, the pre-boot sequence boots the OS, which established the operating environment. The pre-boot sequence also sets up a screen buffer for the OS. An illustrative screen buffer is identified in FIG. 8 as "screen buffer 2" 805.

In an embodiment, "screen buffer 2" 805 is used to support the visual outputs of the OS. However, the contents of "screen buffer 2" 805 may or may not appear on display 116. The determination of which particular screen buffer (for example, "screen buffer 2" 805 or "screen buffer 1" 813, described below) contents displayed on the screen (for example display 116) is controlled by a selection 808 made in user interaction 807. In some cases, the display may visually depict the contents of "screen buffer 2" 805; in other cases, the display may visually depict the contents of "screen buffer 1" 813.

In step 806, the loaded OS interacts with "screen buffer 2" 805. In step 806 the OS may also receive user interaction 807. In some cases the BIOS and/or the keyboard controller may intercept special key codes that let the user switch between the screen buffer 805 and 813; in other cases, the system may have special keys or key combinations for this function.

Returning to step 802, if the process moves to step 809, then in step 809 the BIOS sets up a pre-boot environment. An embedded Linux-style operating system or embedded Unix-style operating system as a pre-boot environment would be desirable, but it is not a requirement; any other suitable OS or rudimentary operating environment may suffice as long as it can support the uses as described herein. For example, in a minimal implementation, a media player and a few required drivers for hardware are loaded, without providing a full pre-boot environment or OS.

In an embodiment, the pre-boot environment may include an email client or an email server. Adding in some cases an email client could allow emails to be read without requiring the main OS to be booted. In some other cases, an email server could be added as well, that could allow an external client, for example a mobile phone networked to the system, to review, edit and respond to messages, without connecting to the internet at large. This would for example allow a user to quickly review a few emails previously downloaded into the computer, without having to unpack or boot the system. In yet some other cases, the server could use the connection to the phone to periodically connect via the phone to the internet, and thus download emails, or retrieve emails previously downloaded to the phone into the notebook. Once the user turns on the notebook, those emails can be instantaneously retrieved into a mail client running on the main operating system, for example by adding an alias mail account or by operating as a mail proxy server.

In step 810, the pre-boot environment connects to data storage 811, which could be, for example, a local hard disk, a local mass storage device, a nonvolatile storage device, or an actual server and hard disk somewhere on the network.

In step 812, updated pre-boot content is loaded from a server, or in some cases, from a local nonvolatile memory (NVM), where it may have been deposited during a previous usage.

In step 814, slides may be optionally loaded and in step 815 one or more videos may be optionally loaded. Steps 814 and 815 may be used to present some type of multimedia presentation with sound, slides and video on "screen buffer 1" 813 for display during boot, for example. These images, slides, video, etc. may adhere to one or more of many standards, but should as well support graphics output protocols (GOP). The user has the ability to interact with the presentations of steps 814 and 815, as described above. Additional programs may be available as indicated by dotted box 816, which programs may support such functions as internet telephony, video-on-demand, downloading, etc.

Controls in user interactions 807 enable the user to choose to interact with either the left-hand process thread (steps 809 and onward) or the right-hand process thread (steps 803 and onward), switching the display 116, keyboard, and mouse focus as desired. As described above, this switching could be executed by a key combination, special key, or other user input means. When the user decides to leave this special environment, he can make a transition in step 817 either to a full pre-boot environment or to a full OS environment.

Further, in some cases, an application is the pre-boot environment can launch a matching application in the OS environment, set up said application identically, and transfer control to said application seamlessly. For example, an IP voice call could be started under the pre-boot DLC. Then in the OS, the same IP voice call app is launched, logged in, and the call transferred, allowing seamless use. Such a feature may require, in addition to mapping pre-boot environment apps to OS apps, a "pipe" between the two environments to transfer program data, etc. from one application to another. In some cases to local IP pipe may be established, in other cases a temporary file on a commonly accessible storage may be used, such as the MSD.

Further, in some instances, a local IP router may be used under the pre-boot environment, allowing both the OS and the pre-boot environment to share a single local area network IP address, by providing a system internal virtual LAN with network address translation (NAT).

It is clear that many modifications and variations of the system and method disclosed herein may be made by one skilled in the art without departing from the spirit of the novel art of this disclosure. For example, BIOS for helping boot up a system may reside in a non-volatile memory. The BIOS has the ability to execute certain programs before booting an operating system, and these programs are able to connect to a server maintaining a database relevant to versions of the BIOS. Further, in some cases the BIOS could download a newer version of BIOS code, and the BIOS could then reprogram the non-volatile memory to use the newer code for the BIOS following the reprogramming. Further, a server may contain a program for automatic BIOS updates and a storage with at least one newer version of a BIOS, with the server responsive to inquiry by a system containing a BIOS, where such an interaction can be made without requiring an operating system present in the system.

Additionally, the BIOS eco-system may contain code allowing the reprogramming to be made without requiring user interaction on the system or a reboot of the system. In some cases, the BIOS may contain code to connect over wireless communication when available, and thus connect to the server. Also, the BIOS may store the older version in a secure file in non-volatile memory, thereby allowing the user to revert to a pervious version in cases when needed or desired.

Other embodiments may include a system with a BIOS for helping boot up a system. The BIOS may reside in a non-volatile memory and may have the ability to execute certain programs before booting an operating system. These programs may be able to launch a pre-boot operating environment. In some cases, this pre-boot operating environment may be a Linux-style operating system in which downloaded Linux C programs may be executed.

Further, this pre-boot operating environment may allow an "instant-on" feature for programs to be executed. In some cases, these programs may include IP telephony or media players, while in other cases, they may include graphics output protocols players. Additionally, in some cases, traditional BIOS boot messages may appear in a small window at the periphery of screen, allowing the majority to be used for these programs. In such cases, the user may indicate interest in an item and bookmark the item for later use, including, for example, purchasing or licensing the item.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more tangible machine-readable mediums storing one or more sequences of instructions, which when executed, cause:
   a BIOS, executing on a machine, providing a pre-boot operating environment that displays one or more advertisements while the BIOS loads an operating system on the machine;
   the BIOS, during the loading of the operating system, receiving input from a user that indicates interest in an item in the one or more advertisements;
   the BIOS storing bookmark data to evidence that the user sent the input for the item;

after loading the operating system, consulting the bookmark data and providing an interface to allow the user to purchase or license the item;

the BIOS communicating with an external server over a wireless network to determine if an update to the one or more advertisements is available; and upon the BIOS determining that the update to the one or more advertisements is available, the BIOS receiving, over the wireless network, the update to the one or more advertisements.

2. The one or more tangible machine-readable mediums of claim 1, wherein the pre-boot operating environment may be a Linux style operating environment or Unix style operating environment.

3. The one or more tangible machine-readable mediums of claim 1, wherein the pre-boot environment allows an application to be executed prior to loading the operating system.

4. The one or more tangible machine-readable mediums of claim 1, wherein the pre-boot environment allows an application designed to be executed in conjunction with an operating system to be executed while loading the operating system.

5. The one or more tangible machine-readable mediums of claim 1, wherein the pre-boot environment supports IP telephony.

6. The one or more tangible machine-readable mediums of claim 1, wherein the pre-boot environment includes a media player.

7. The one or more tangible machine-readable mediums of claim 1, wherein the pre-boot environment includes an email client or an email server.

8. The one or more tangible machine-readable mediums of claim 1, wherein the pre-boot environment includes a graphics output protocol (GOP) player.

9. The one or more tangible machine-readable mediums of claim 1, wherein execution of the one or more sequences of instructions further causes:

displaying BIOS boot messages within a window appearing in less than a whole portion of a physical display.

10. An apparatus, comprising:

one or more processors; and one or more machine-readable mediums storing one or more sequences of instructions, which when executed by the one or more processors, causes:

a BIOS, executing on a machine, providing a pre-boot operating environment that displays one or more advertisements while the BIOS loads an operating system on the machine;

the BIOS, during the loading of the operating system, receiving input from a user that indicates interest in an item in the one or more advertisements;

the BIOS storing bookmark data to evidence that the user sent the input for the item;

after loading the operating system, consulting the bookmark data and providing an interface to allow the user to purchase or license the item;

the BIOS communicating with an external server over a wireless network to determine if an update to the one or more advertisements is available; and upon the BIOS determining that the update to the one or more advertisements is available, the BIOS receiving, over the wireless network, the update to the one or more advertisements.

11. The one or more tangible machine-readable mediums of claim 10, wherein the pre-boot operating environment may be a Linux operating environment or Unix operating environment.

12. The apparatus of claim 10, wherein the pre-boot environment allows an application designed to be executed in conjunction with an operating system to be executed prior to loading the operating system.

13. The apparatus of claim 10, wherein the pre-boot environment allows an application to be executed while loading the operating system.

14. The apparatus of claim 10, wherein the pre-boot environment supports IP telephony.

15. The apparatus of claim 10, wherein the pre-boot environment includes a media player.

16. The one or more tangible machine-readable mediums of claim 10, wherein the pre-boot environment includes an email client or an email server.

17. The apparatus of claim 10, wherein the pre-boot environment includes a graphics output protocol (GOP) player.

18. The apparatus of claim 10, wherein execution of the one or more sequences of instructions further causes.

displaying BIOS boot messages within a window appearing in less than a whole portion of a physical display.

19. A method for booting a device, comprising:

a BIOS, executing on a machine providing a pre-boot operating environment that displays one or more advertisements while the BIOS loads an operating system on the machine;

the BIOS, during the loading of the operating system, receiving input from a user that indicates interest in an item in the one or more advertisements;

the BIOS storing bookmark data to evidence that the user sent the input for the item;

after loading the operating system, consulting the bookmark data and providing an interface to the user which allows the user to purchase or license the item;

the BIOS communicating with an external server over a wireless network to determine if an update to the one or more advertisements is available; and upon the BIOS determining that the update to the one or more advertisements is available, the BIOS receiving, over the wireless network, the update to the one or more advertisements.

20. The method of claim 19, wherein the pre-boot environment allows an application to be executed prior or during loading of the operating system.

21. The method of claim 19, wherein the pre-boot environment supports IP telephony.

* * * * *